United States Patent
Lee (10) Patent No.: US 7,617,693 B2
(45) Date of Patent: Nov. 17, 2009

(54) WATER PURIFYING SYSTEM AND APPARATUS FOR SIMULTANEOUSLY MAKING ICE AND COLD WATER USING ONE EVAPORATOR

(75) Inventor: Soon-Se Lee, Seoul (KR)

(73) Assignee: Chung Ho Nais Co., Ltd., Choongbuk-Do (KR)

( * ) Notice: Subject to any disclaimer, the term of this patent is extended or adjusted under 35 U.S.C. 154(b) by 486 days.

(21) Appl. No.: 11/342,117

(22) Filed: Jan. 27, 2006

(65) Prior Publication Data

US 2007/0089451 A1     Apr. 26, 2007

(30) Foreign Application Priority Data

Oct. 21, 2005   (KR) ..................... 10-2005-0099663

(51) Int. Cl.
  *F25C 1/12* (2006.01)
(52) U.S. Cl. .............................. 62/135; 62/347; 62/348; 62/353
(58) Field of Classification Search .................. 62/340, 62/347, 348, 135, 137, 351, 353
  See application file for complete search history.

(56) References Cited

U.S. PATENT DOCUMENTS 3,418,823 A * 12/1968 Vival .......................... 62/138
3,470,709 A * 10/1969 Asakawa ....................... 62/347
4,199,956 A * 4/1980 Lunde .......................... 62/138
4,207,994 A   6/1980 Offlee, Sr.
5,237,837 A * 8/1993 Naruse et al. .................. 62/434
6,205,807 B1 * 3/2001 Broadbent ..................... 62/347
7,010,933 B2 * 3/2006 Ishitomi et al. ................ 62/347
7,201,014 B2 * 4/2007 Hornung ....................... 62/347
7,201,015 B2 * 4/2007 Feldman et al. ................ 62/347

FOREIGN PATENT DOCUMENTS

| JP | 4-363567 | 12/1992 |
|---|---|---|
| JP | 9-152239 | 6/1997 |
| JP | 2002-206827 | 7/2002 |
| KR | 1999-0041499 | 12/1999 |
| KR | 20-2003-0330516 | 10/2003 |

* cited by examiner

*Primary Examiner*—William E Tapolcai
(74) *Attorney, Agent, or Firm*—Jordan and Hamburg LLP (57) ABSTRACT

Disclosed herein are water purifying system and apparatus for simultaneously making ice and cold water using one evaporator, which can make cold water in various forms only by changing the system and make ice of a predetermined amount by using cold water of less than a predetermined temperature as raw water for ice-making, thereby saving energy. The water purifying system and apparatus can rapidly provide cold water by the simple operation of the water gutter of the ice-making unit and the circulation of water contained in the cold water tank to the water gutter by the circulation pump, and provide ice of the predetermined amount by making ice using the cold water without regard to the changes of the temperature of raw water and the surrounding temperature.

7 Claims, 12 Drawing Sheets

Prior Art

FIG. 8

Prior Art

WATER PURIFYING SYSTEM AND APPARATUS FOR SIMULTANEOUSLY MAKING ICE AND COLD WATER USING ONE EVAPORATOR

BACKGROUND OF THE INVENTION

1. Field of the Invention

The present invention relates to water purifying system and apparatus for simultaneously making ice and cold water in various forms using one evaporator, and more particularly, to water purifying system and apparatus for simultaneously making ice and cold water using one evaporator, which can make cold water in various forms only by changing the system and make ice of a predetermined amount by using cold water of less than a predetermined temperature as raw water for ice-making, thereby saving energy.

2. Background Art

Figure 7:
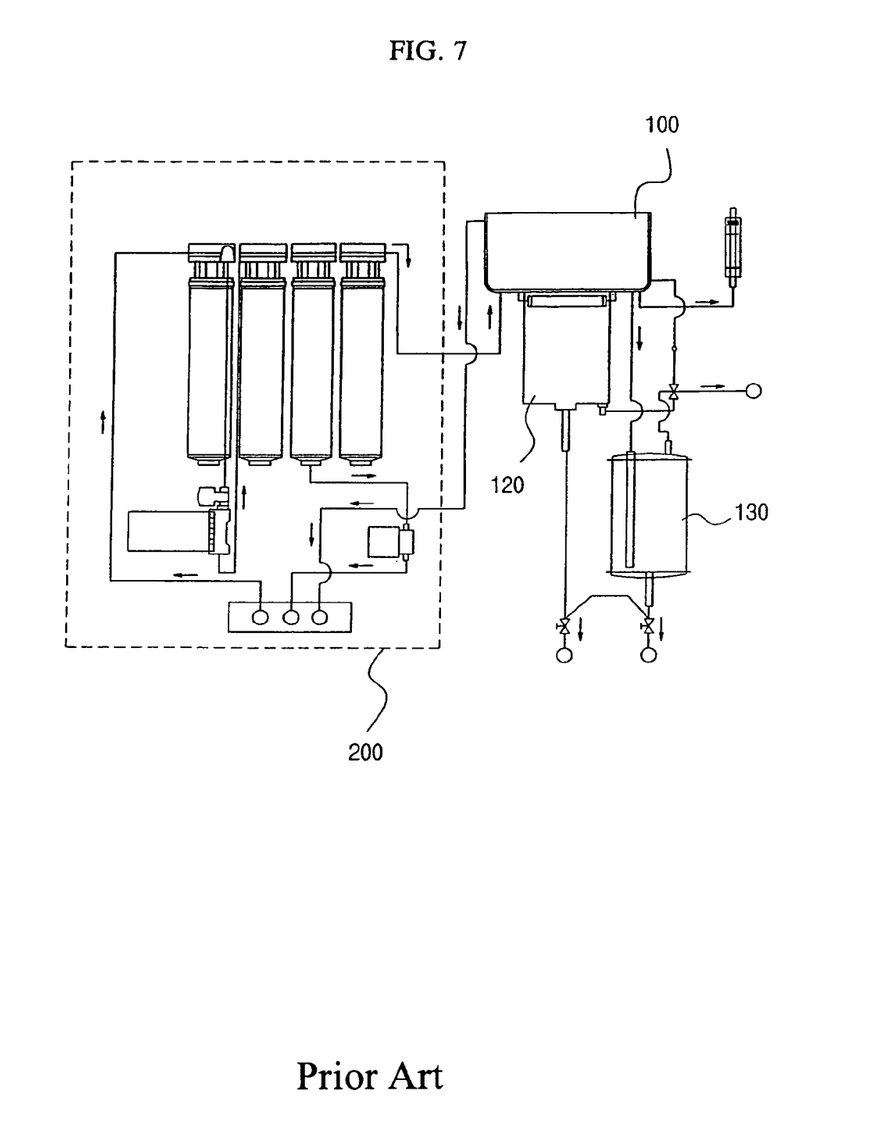
FIG. 7 is a view showing a flow of water in a conventional water purifier.

In general, as shown in FIG. 7, a water purifier includes: a purified water tank 110 for storing water purified by filtering means 100; and a hot water tank 130 and a cold water tank 120 for storing purified water received from the purified water tank 110. Hot water and cold water respectively stored in the hot water tank 130 and the cold water tank 120 are discharged through a discharge valve.

At this time, the cold water tank 120 conducts thermal exchange by a refrigerating cycle for cooling the stored water to a low temperature, and the hot water tank 130 includes heating means for heating the stored water to a high temperature.

However, due to diversification of living, consumers want to be provided with ice of a directly eatable condition as well as hot water and cold water by the water purifier.

To satisfy the consumers' demand, Korean Patent No. 407867 granted to the same inventor as the present invention discloses a water purifier capable of providing ice.

Figure 8:
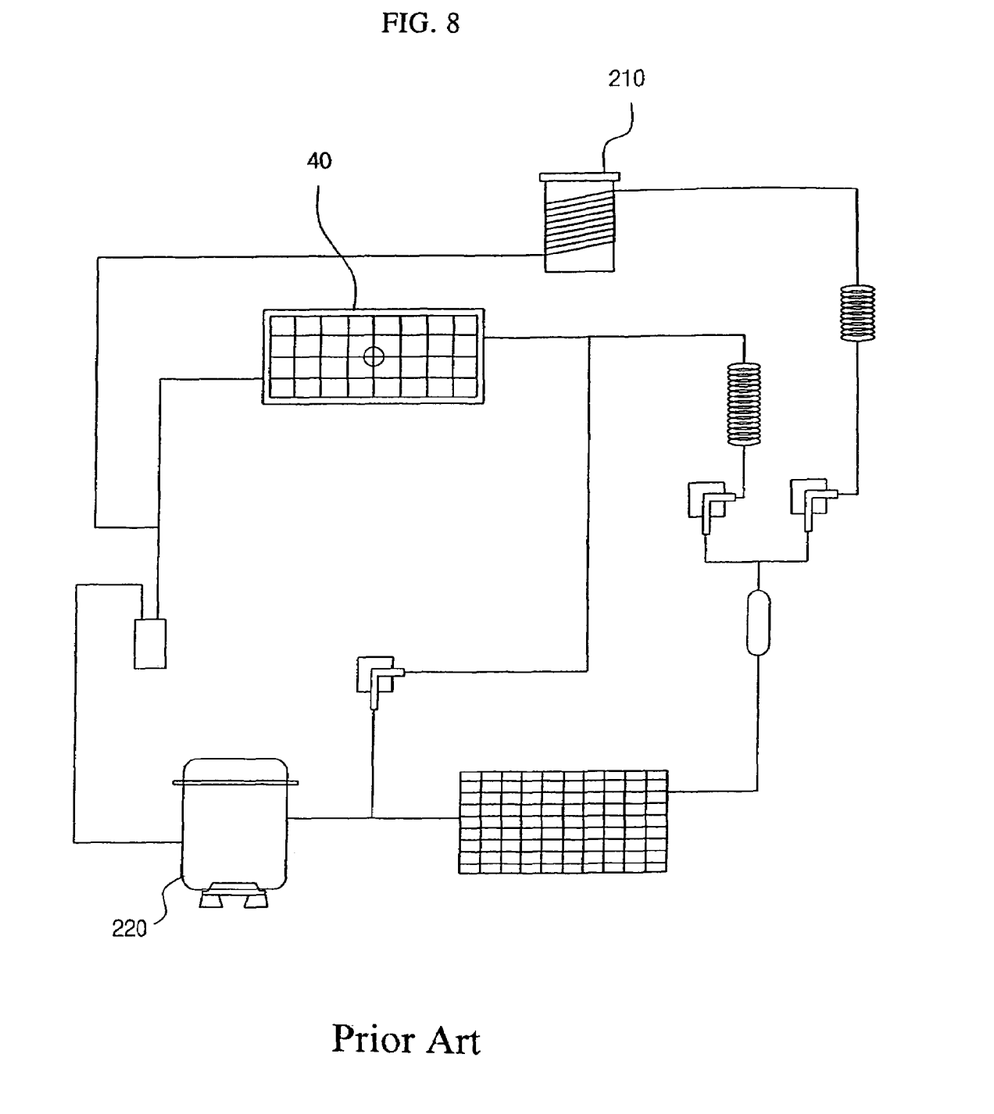
FIG. 8 is a view showing a flow of refrigerant in a conventional water purifier having ice-making means.

However, the water purifier, as shown in FIG. 8, has to use two evaporators 200 and 210 to make colder water and ice, and so, causes an increase of the product price and energy consumption due to an increase of volume of a condenser 220. In addition, the water purifier causes a change of an ice-making amount in a series of the ice-making processes according to changes of raw water temperature and surrounding temperature.

SUMMARY OF THE INVENTION

Accordingly, to solve the above disadvantages occurring in the prior arts, and it is an object of the present invention to provide water purifying system and apparatus for simultaneously making ice and cold water using one evaporator, which can make cold water in various forms only by changing the system and make ice of a predetermined amount by using cold water of less than a predetermined temperature as raw water for ice-making, thereby saving energy.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1:
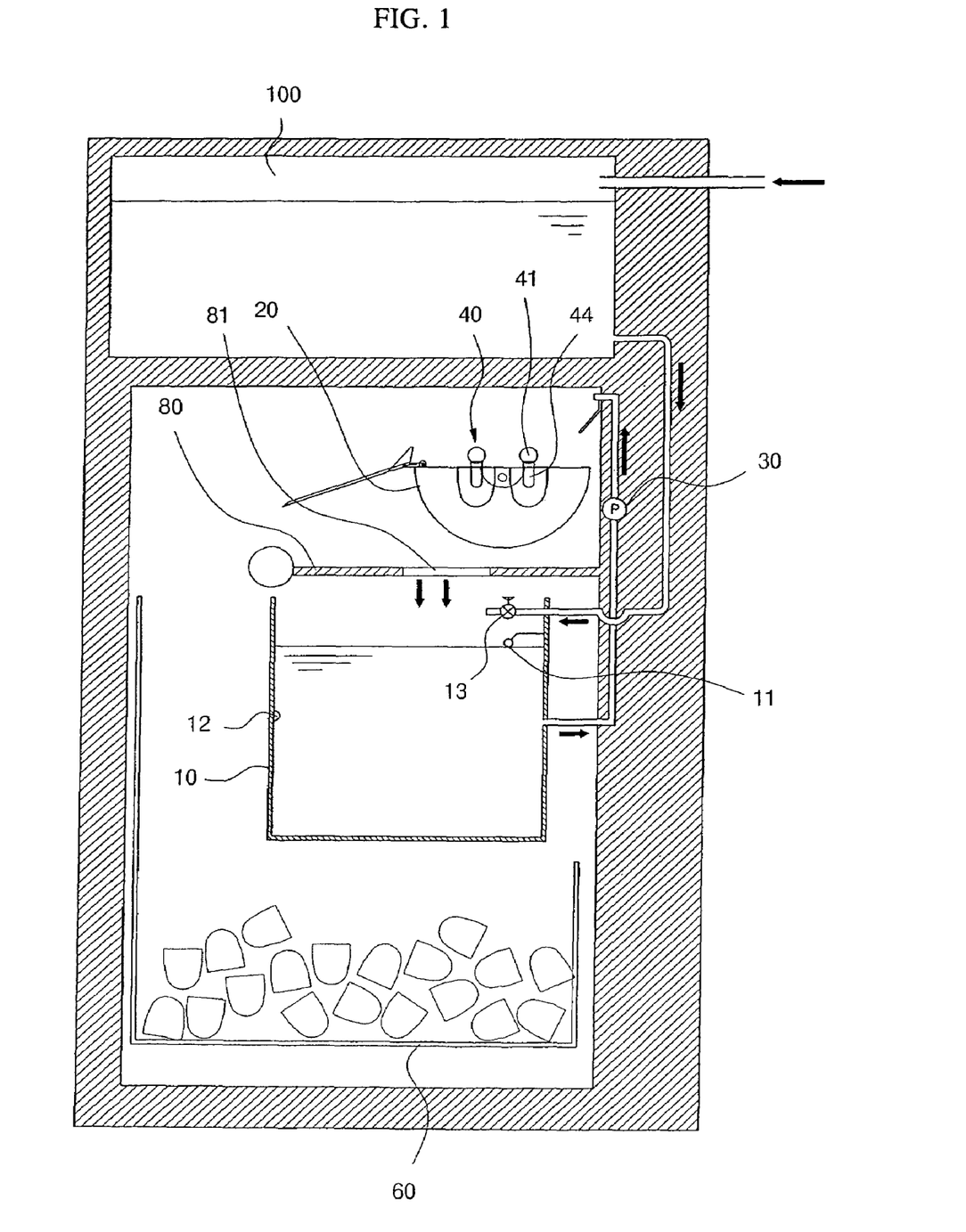
FIG. 1 is a brief view of a structure of the present invention.
Figure 2:
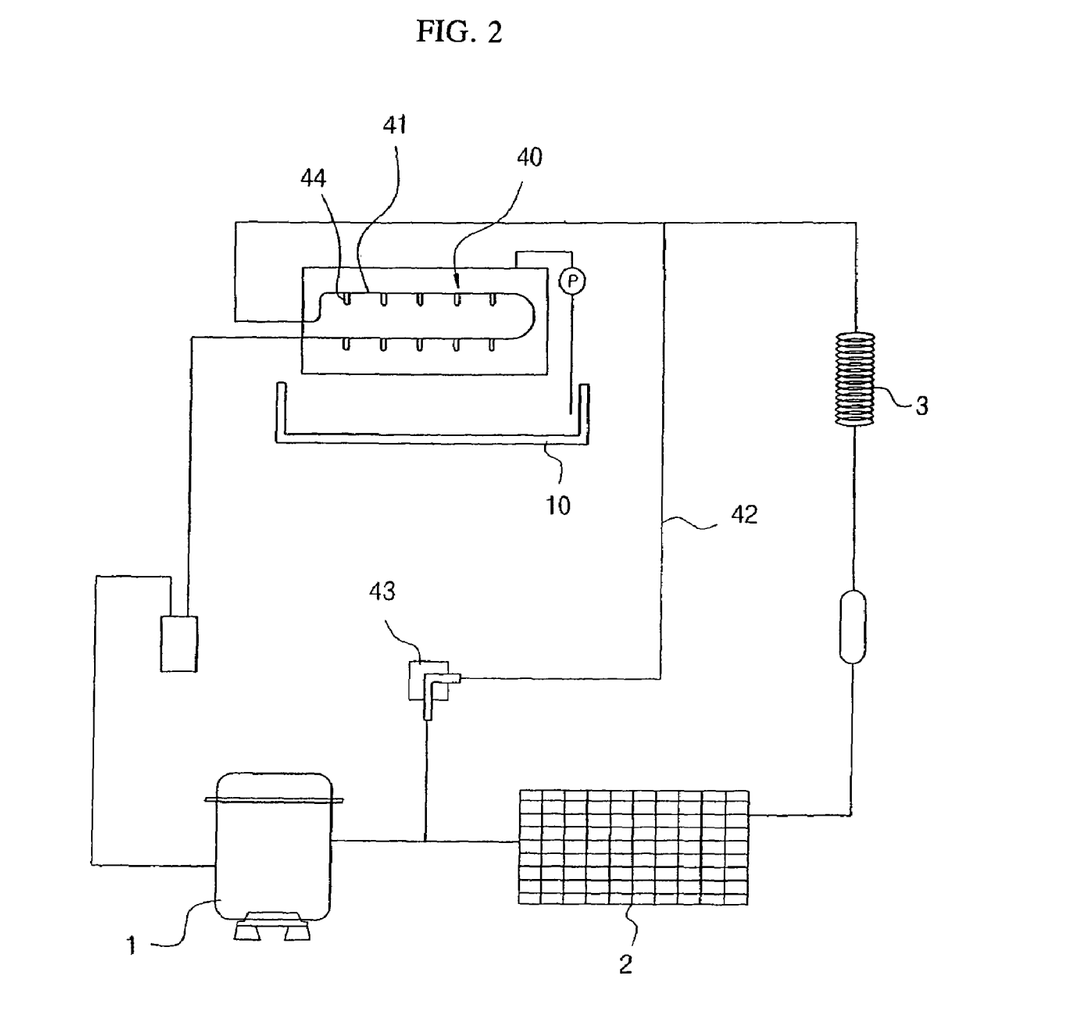
FIG. 2 is a view showing a flow of refrigerant according to the present invention
Figure 3:
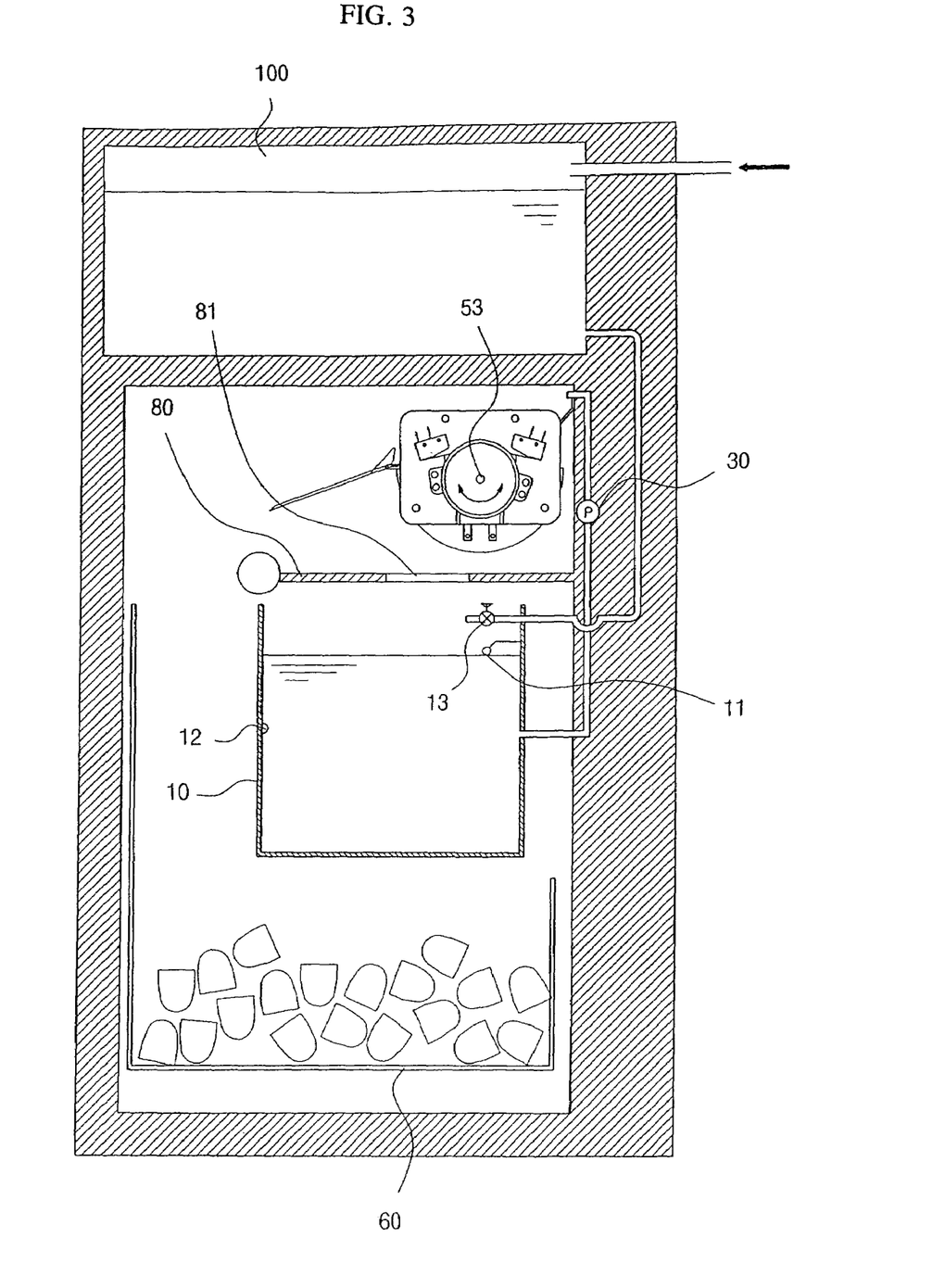
FIG. 3 is a brief view showing a connection state between a cold water tank and an ice-making unit.

FIG. 1 shows a structure of the present invention, and FIG. 2 shows a flow of refrigerant for making cold water and ice using one evaporator according to the present invention.

The present invention includes the existing means for making hot water mounted in a conventional water purifier, and will be described focused on means for making ice and cold water.

A water purifier according to the present invention includes: a purified water tank 110 for first storing water purified by filtering means 100 which purifies raw water; a cold water tank 10 for storing the water received from the purified water tank 110 as cold water and providing the cold water as raw water for ice-making; a circulation pump 30 for circulating water stored in the cold water tank 10; a water gutter 20 for temporarily storing ice and water to make ice and cold water using the water circulated by the circulation pump 30; an evaporator 41 having a dipping part 44 which is dipped in water stored in the water gutter 20; ice-making means 40 having a deicing line 42 to which a gas of high temperature and high pressure is introduced in order to instantaneously deice the ice suspending on the dipping part 44 of the evaporator 41; gutter driving means 50 for inducing rotation of the water gutter 20 for ice-making and deicing after the ice-making is completed in a state where ice suspends on the dipping part 44 of the evaporator 41 of the ice-making means 40; gutter holding means 25 for stopping the rotation of the water gutter 20 after the water gutter 20 is rotated at a predetermined angle; a grill 70 operated when the water gutter 20 is rotated and transferring the deiced ice to an ice bin 60; and a slide board 80 having grooves 81 and 81a for passing water and ice of lower temperature when the grill 70 is operated.

At this time, the cold water tank 10 located at a proper position for receiving water dropping from the water gutter 20 includes a water level sensor 11 for sensing and controlling a water level according to the volume of the cold water tank 10, and a first solenoid valve 13 for cutting off water supplied from the purified water tank 110 to the cold water tank 10 according to a sensing signal when water of a predetermined amount is introduced into the cold water tank 10. The circulation pump 30 transfers water stored in the cold water tank 10 to the water gutter 20 of the ice-making unit.

As shown in FIG. 2, the gas of high temperature and high pressure is converted into liquid refrigerant of medium temperature and medium pressure by thermal exchange of a condenser 2 when a compressor 1 of a refrigerating cycle is operated, and the liquid refrigerant of medium temperature and medium pressure is converted into liquid refrigerant of low temperature and low pressure by thermal exchange of a capillary 3. After that, the liquid refrigerant of low temperature and low pressure is circulated to the ice-making means 40 of the ice-making unit. At this time, the liquid refrigerant of low temperature and low pressure is converted into cold water while rapidly lowering the temperature of water stored in the water gutter 20 since the dipping part 44 of the evaporator 41 of the ice-making means 40 is dipped in the water contained in the water gutter 20.

The temperature of the water stored in the cold water tank 10 is gradually lowered while the water stored in the cold water tank 10 is circulated to the water gutter 20 of the ice-making unit for a predetermined time period (time period that the temperature of the cold water tank 10 reaches a predetermined value). Such circulation process is continued till the temperature of the cold water tank 10 reaches the value set by a temperature sensor 12 mounted inside the cold water tank 10.

In this case, when the water temperature of the cold water tank 10 reaches the value set by the temperature sensor 12 of the cold water tank 10, the compressor 1 is stopped, and the circulation pump 30 is operated for a predetermined time period to deice the remaining ice formed on the dipping part 44.

As described above, since the cold water tank 10 keeps the lower temperature and also the water introduced into the water gutter 20 from the cold water tank 10 by the circulation pump 30 during the ice-making operation keeps the lower temperature, the dipping part 44 of an inlet and an outlet of the evaporator 41 can make the ice shape uniform, a change of the ice-making amount according to a change of surrounding temperature is reduced, and the ice-making by the ice-making means 40 of the ice-making unit is proceeded very fast as ice is made using cold water of low temperature.

When the water stored in the cold water tank 10 is circulated to the water gutter 20 by the circulation pump 30, the ice-making means 40 is simultaneously operated so that the water of the cold water tank 10 is continuously circulated to make ice, or the ice-making means 40 is continuously operated and the circulation pump 30 repeats ON-OFF modes in order to rapidly lower the water temperature of the cold water tank 10. That is, when the water gutter 20 is filled with water after the circulation pump 30 is turned on, the circulation pump 30 is turned off to rapidly cool the water stored in the water gutter 20. After that, when the circulation pump 30 is turned on again, the water temperature of the cold water tank 10 is rapidly lowered while the rapidly cooled water of low temperature is introduced into the cold water tank 10.

Furthermore, to obtain an energy saving effect, the circulation pump 30 and the ice-making means 40 repeat the ON-OFF modes at predetermined time intervals. Then, the water purifying apparatus can provide cold water and save energy.

Moreover, when the water of the cold water tank 10 is repeatedly introduced into the water gutter 20 by the circulation pump 30 in a state where the ice-making means 40 is operated and the water gutter 20 is filled with water, the circulation pump 30 is stopped. After that, when a predetermined time period is passed, the gutter driving means 50 is operated, and so, water contained in the water gutter 20 is poured down and water of low temperature is introduced into the cold water tank 10.

Figure 4:
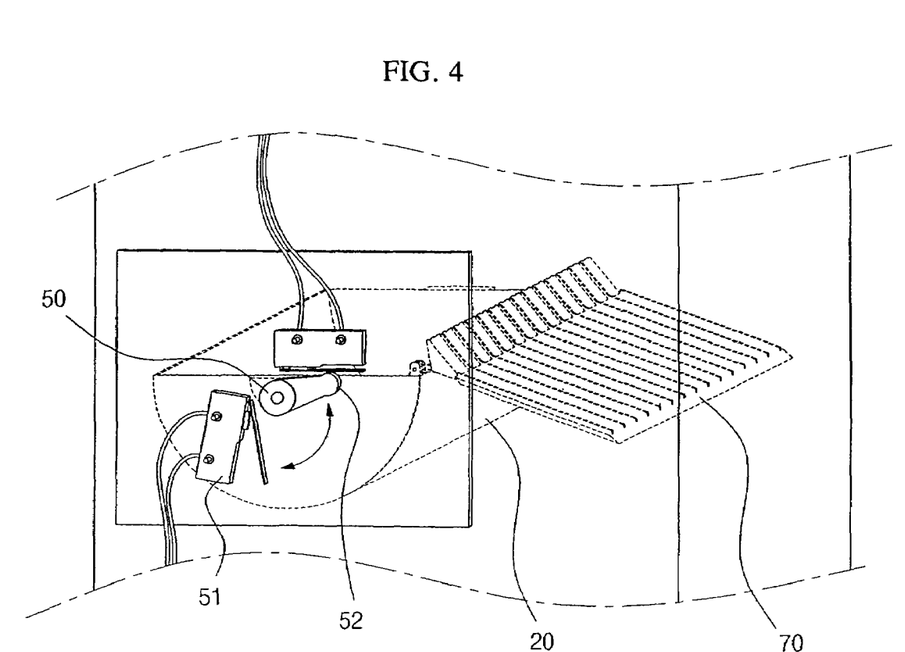
FIG. 4 is a brief view showing a rotation control of a water gutter according to a preferred embodiment of the present invention.
Figure 4A:
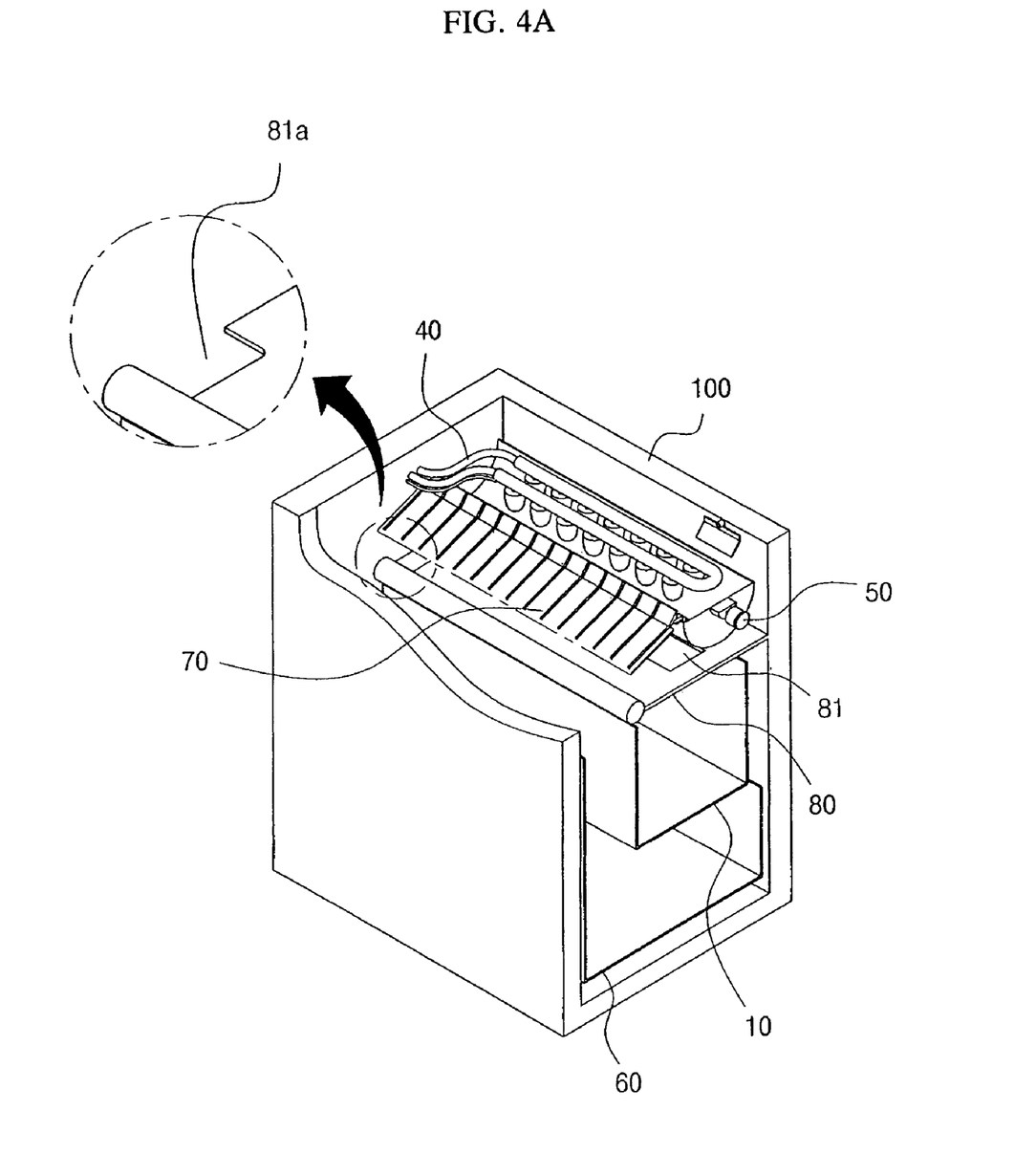
FIG. 4A is a brief view showing that some ice is introduced into the cold water tank.
Figure 4B:
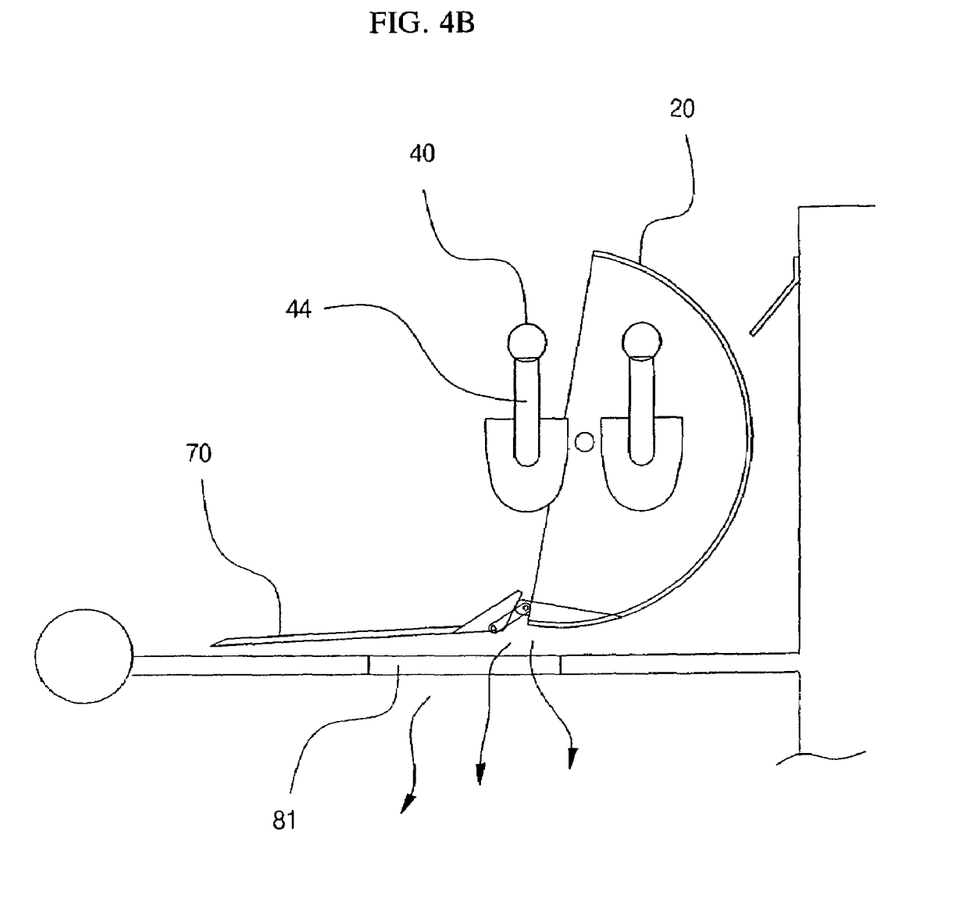
FIGS. 4B to 4D are views showing a state where deiced ice is transferred into an ice bin.
Figure 4C:
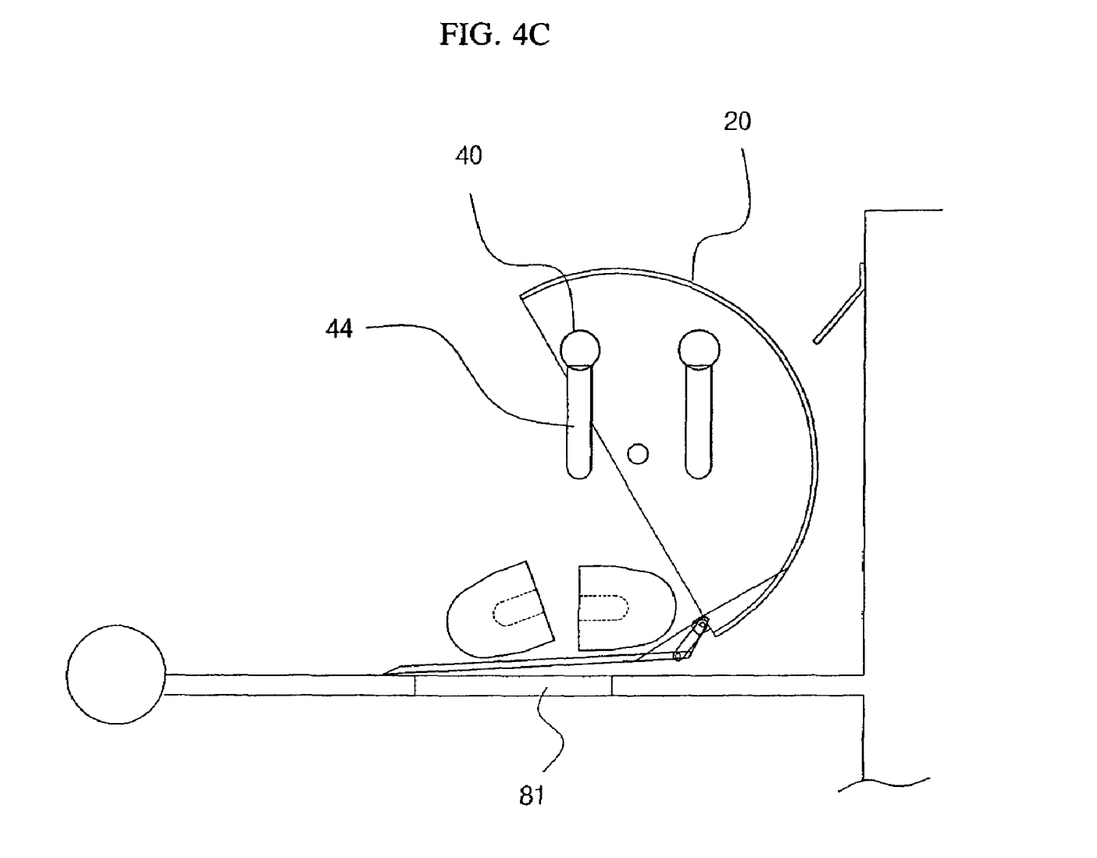
Figure 4D:
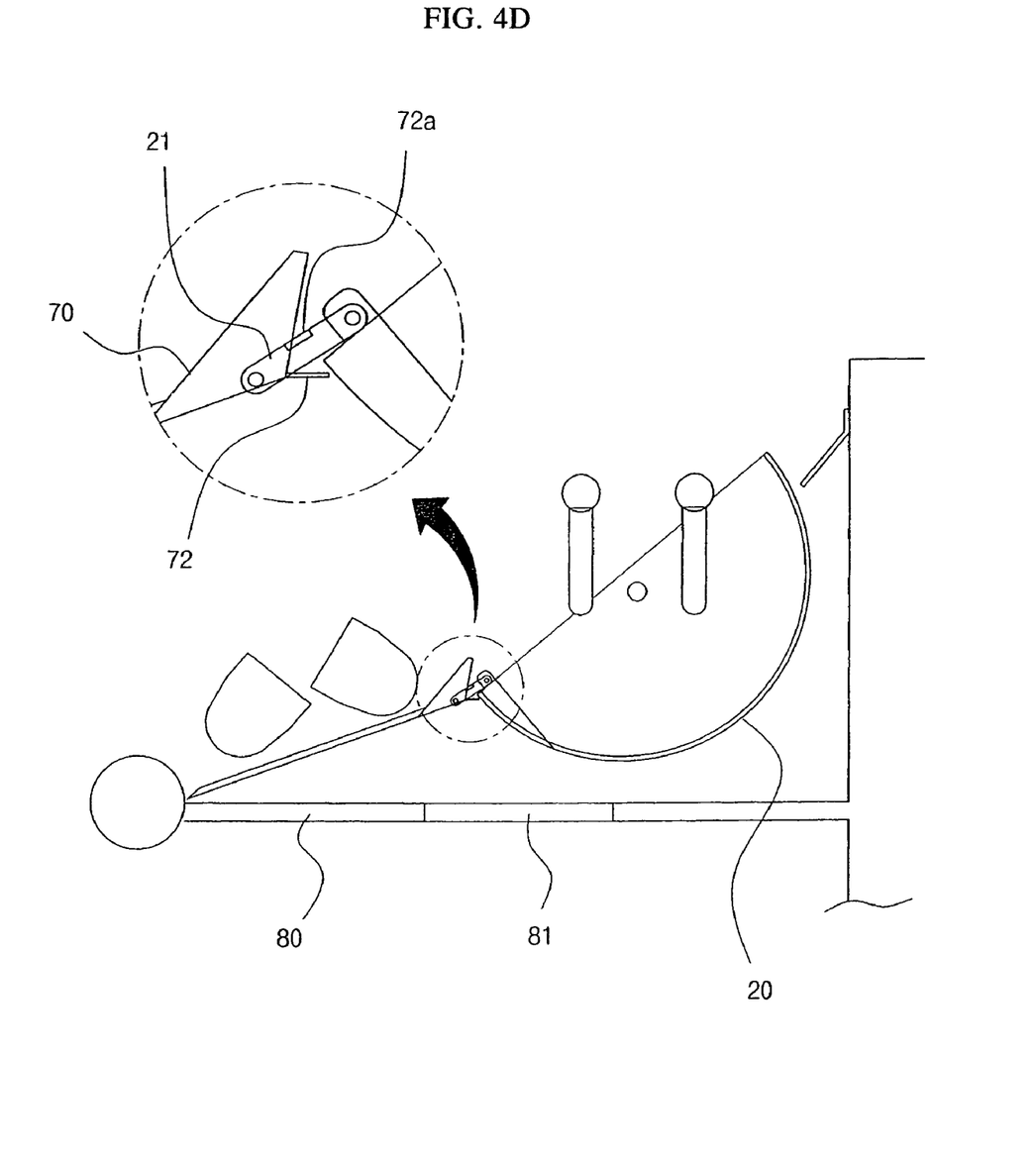

As described above, since ice is made by cold water of low temperature, the change in ice-making amount according to the change of surrounding temperature is reduced, and the ice shape formed at the inlet and the outlet of the evaporator becomes uniform. When the ice-making is finished in the evaporator 41 of the ice-making means 40 of the ice-making unit, the gutter driving means 50 is operated by control of the temperature value of the outlet of the evaporator set according to the change of surrounding conditions, and the water gutter 20 is rotated by the operation of the gutter driving means 50 as shown in FIGS. 4 to 4D. The cold water of low temperature remaining in the water gutter 20 is introduced into the cold water tank 10 through a groove 81 of the slide board 80, and a refrigerant gas of high temperature and high pressure for deicing is introduced into the ice-making means 40 of the ice-making unit through the deicing line 42 by a second solenoid valve 43, whereby ice suspending on the dipping part 44 of the evaporator 41 of the ice-making means 40 is instantaneously deiced, and drops down.

At this time, the introduction of the liquid refrigerant of low temperature and low pressure into the ice-making means 40 is automatically stopped or an amount of the introduced liquid refrigerant is remarkably reduced due to a pressure difference between the liquid refrigerant of low temperature and low pressure and the refrigerant gas of high temperature and high pressure.

When the deicing is completed, the second solenoid valve 43 for providing the refrigerant gas of high temperature and high pressure is closed, and at the same time, the water gutter 20 is moved to its original position. After that, when the grill 70 collapsibly mounted at the front end of the water gutter 20 pushes forward the ice dropping on the slide board 80 having the grooves 81 and 81a, ice of a predetermined amount drops into the cold water tank 10 through the groove 81a of the slide board 80 to keep the cold water in lower temperature, and remaining ice drops into the ice bin 60 located at the lower end of the cold water tank 10.

At this time, the water gutter 20 can be moved to its original position after the grill 70 is moved forward by the rotation of the water gutter 20 and pushes ice, since the grill 70 is rotatably mounted on a collapsible grill hinge part 21 by a pin 71, and the collapsible grill hinge part 21 is formed in front of the water gutter 20.

In a state where the grill 70 is moved backward, the groove 81 of the slide board 80 is stopped by the grill 70, but the groove 81a is not stopped.

A locking device 25 is provided to prevent that the operation of the grill 70 is obstructed by an excessive rotation of the water gutter 20, so that the water gutter 20 can be rotated at uniform angle.

Figure 5:
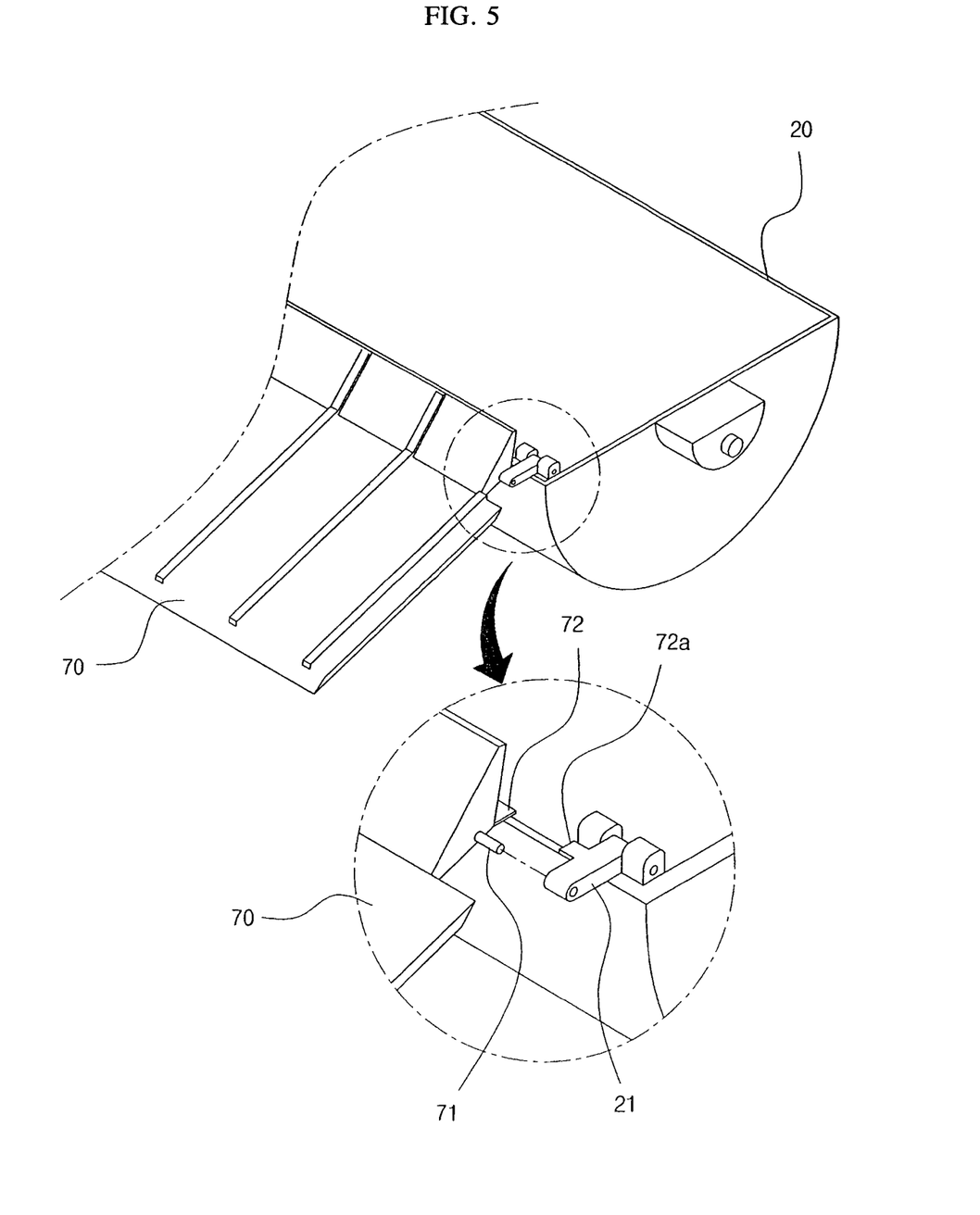
FIG. 5 is a perspective view showing a state where a grill is mounted on the water gutter.
Figure 6:
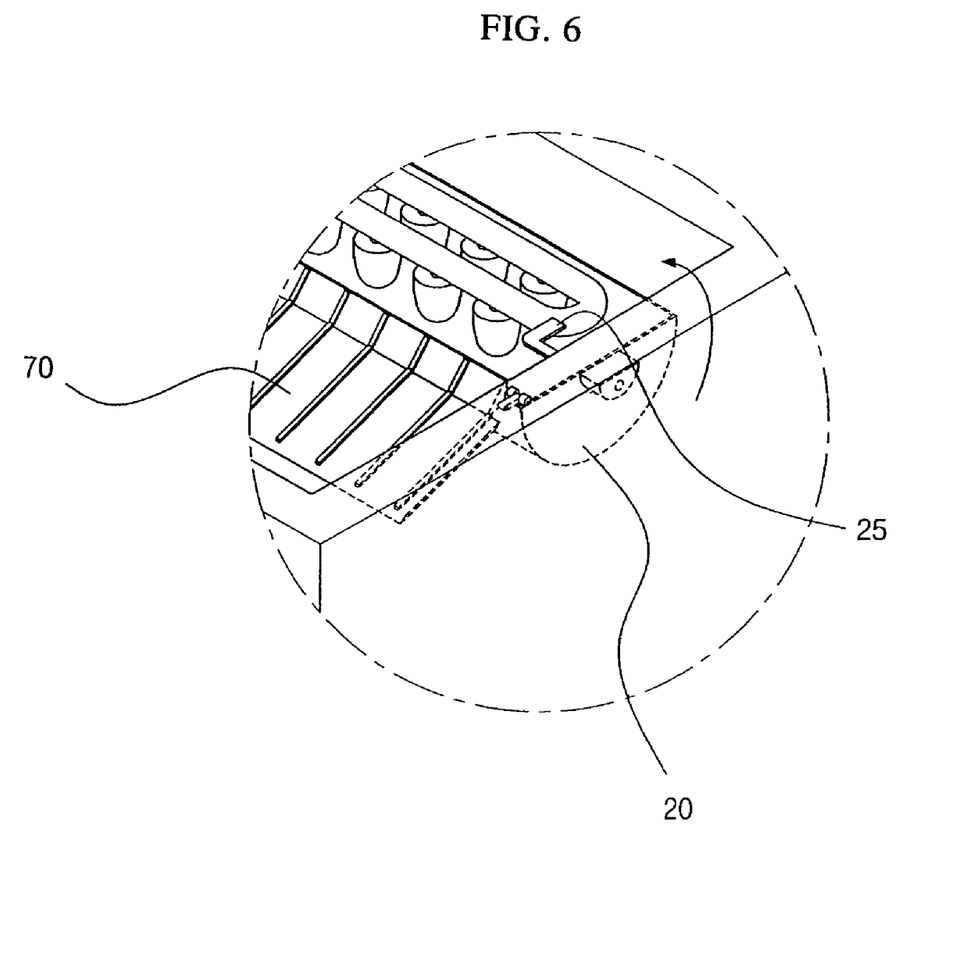
FIG. 6 is a brief view showing a control of a rotation angle of the water gutter.

As shown in FIGS. 4D and 5, the grill 70 is operated within a predetermined angle range by coupling jaws 72 and 72a.

When it is confirmed that the water gutter 20 is returned to its original position by a position switch 51 located at the gutter driving means 50, if the temperature of the cold water tank 10 is higher than the value set by the temperature sensor 12, water of the cold water tank 10 is circulated by the circulation pump 30 in a state where the ice-making unit is operated till the temperature of the cold water tank 10 and the water gutter 20 reaches the value set by the temperature sensor 12.

At this time, as shown in FIG. 4, a cam 52 mounted on the gutter driving means 50 stops a motor 53 by the position switch 51 or drives the motor 53 in the opposite direction when excessive load is applied, and the motor 53 rotating forward and backward is turned on or off by the position switch 51.

When the water temperature of the cold water tank 10 is less than the value set by the temperature sensor 12, the ice-making unit is operated again, and repeats the ice-making process.

As described above, the present invention can simultaneously make ice and cold water using one evaporator. In more detail, the present invention can rapidly provide cold water by the simple operation of the water gutter 20 of the ice-making unit and the circulation of water contained in the cold water tank to the water gutter 20 by the circulation pump 30, and provide ice of the predetermined amount by making ice using the cold water without regard to the changes of the temperature of raw water and the surrounding temperature.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A water purifying system for simultaneously making ice and cold water using one evaporator comprising:
    means for introducing water purified through filtering means into a cold water tank while controlling the water by the first solenoid valve;
    means for circulating the water introduced into the cold water tank to a water gutter by a circulation pump;
    means for circulating the water introduced into the water gutter while it is cooled by an evaporator of ice-making means, whereby cold water is stored in the cold water tank and at the same time an ice-making is conducted by using the cold water as raw water for ice-making;
    means for rotating the water gutter by an operation of gutter driving means after completion of the ice-making and at the same time introducing refrigerant gas of high temperature and high pressure controlled by the second solenoid valve through a deicing line into the evaporator and deicing; and
    means for transferring the deiced ice to an ice bin and transferring cold water, which is not made into ice, to the cold water tank, wherein
    the water of the cold water tank is continuously circulated to the water gutter of an ice-making unit by the circulation pump till water temperature of the cold water tank reaches a value set by a temperature sensor, and then the ice-making is conducted when the water temperature of the cold water tank reaches the set value.

2. The water purifying system according to claim 1, wherein the ice-making process is repeatedly performed when the value of the water temperature of the cold water tank is lower than that set by the temperature sensor after it is confirmed that the water gutter is returned to its original position by a position switch located at the gutter driving means.

3. The water purifying system according to claim 1, wherein cold water is generated through the steps of repeatedly introducing water of the cold water tank into the water gutter by the circulation pump in a state where the ice-making means is operated, stopping the circulation pump when the water gutter is filled with water, and pouring down water of the water gutter by the operation of the gutter driving part after a predetermined time period is passed so as to introduce water of low temperature into the cold water tank.

4. A water purifying apparatus for simultaneously making ice and cold water using one evaporator comprising:
    a purified water tank for first storing water purified by filtering means which purifies raw water;
    a cold water tank for storing the water received from the purified water tank as cold water;
    a circulation pump for circulating water stored in the cold water tank;
    a water gutter for temporarily storing ice and water to make ice and cold water using the water circulated by the circulation pump;
    an evaporator having a dipping part which is dipped in water stored in the water gutter;
    ice-making means having a deicing line to which a gas of high temperature and high pressure is introduced in order to instantaneously deice the ice suspending on the dipping part of the evaporator;
    gutter driving means for inducing rotation of the water gutter for ice-making after the ice-making has been completed in a state where ice suspends on the dipping part of the evaporator of the ice-making means; and
    a grill, hingeably mounted by a pin, operated when the water gutter is rotated and transferring the deiced ice to an ice bin.

5. The water purifying apparatus according to claim 4 wherein the grill is restricted in its operation range by coupling jaws.

6. The water purifying apparatus according to claim 5, wherein the grill moves on a slide board having discharge grooves.

7. The water purifying apparatus according to claim 6, wherein the slide board includes a discharge groove formed at an edge portion thereof for discharging ice of a predetermined amount to the cold water tank and a discharge groove formed at the central portion thereof for discharging water of the water gutter to the cold water tank.

* * * * *